US007464632B2

(12) United States Patent

Zeeb et al.

(10) Patent No.: US 7,464,632 B2
(45) Date of Patent: Dec. 16, 2008

(54) PRODUCT FENCE FOR A FOOD SLICER

(75) Inventors: Scott M. Zeeb, Chicago, IL (US); James Fournier, Antioch, IL (US); Frank Bondarowicz, Park Ridge, IL (US)

(73) Assignee: Premark FEG L.L.C., Wilmington, DE (US)

( * ) Notice: Subject to any disclaimer, the term of this patent is extended or adjusted under 35 U.S.C. 154(b) by 149 days.

(21) Appl. No.: 11/349,414

(22) Filed: Feb. 7, 2006

(65) Prior Publication Data

US 2007/0180971 A1 Aug. 9, 2007

(51) Int. Cl.
*B23D 45/00* (2006.01)
*B26D 7/06* (2006.01)

(52) U.S. Cl. ............................ 83/720; 83/418; 83/451; 83/932

(58) Field of Classification Search .................. 83/717, 83/932, 452, 467.1, 418, 419, 703–731, 673, 83/381, 438, 477.2; D7/673, 381
See application file for complete search history.

(56) References Cited

U.S. PATENT DOCUMENTS

| | | | | |
|---|---|---|---|---|
| 2,476 A | | 2/1842 | Morris | |
| 19,982 A | | 4/1858 | Conroy | |
| 28,179 A | | 5/1860 | Hunter | |
| 1,424,875 A | | 8/1922 | Braun | |
| 1,428,292 A | | 9/1922 | Lucey | |
| 1,648,103 A | * | 11/1927 | Ball | 40/658 |
| 1,939,740 A | | 12/1933 | Van Berkel | |
| 1,948,811 A | | 2/1934 | Van Berkel | |
| 1,977,418 A | | 10/1934 | Winkler | |
| 2,026,096 A | | 12/1935 | Muhlbauer | |
| 2,052,365 A | | 8/1936 | Stukart | |

(Continued)

FOREIGN PATENT DOCUMENTS

CH 388545 A 2/1965

(Continued)

OTHER PUBLICATIONS

Hobart 2712 Slicer Product Sheet Release Date: Jun. 2004 www.hobartcorp.com/products/food-preparation/food-prep_slicer.*

(Continued)

*Primary Examiner*—Jason D Prone
*Assistant Examiner*—Joseph DeFrank
(74) *Attorney, Agent, or Firm*—Thompson Hine LLP

(57) ABSTRACT

A food slicer is provided having a support member including a base portion and an upstanding portion integrally formed with the base portion. The upstanding portion includes a rotating cutting blade secured thereto for slicing food product and at least one motor positioned within the upstanding portion for rotating the cutting blade. The base portion includes a food product table slidably secured thereto and is movable across the cutting blade for holding product while it is being sliced by the cutting blade. An adjustable gage plate also is provided for determining the thickness of a food product to be sliced by the cutting blade. A product fence for assisting in holding and stabilizing food product during slicing is included where the fence is removably secured to a portion of the food product table by frictional engagement therebetween.

16 Claims, 5 Drawing Sheets

U.S. PATENT DOCUMENTS

| | | | | |
|---|---|---|---|---|
| 2,052,367 | A | 8/1936 | Folk | |
| 2,486,797 | A | 11/1949 | Meyer | |
| 2,563,120 | A | 8/1951 | Klingens et al. | |
| 2,573,629 | A | 10/1951 | Klingens et al. | |
| 2,598,740 | A | 6/1952 | Zimmermann | |
| 2,614,373 | A | 10/1952 | Van Duyn et al. | |
| 2,621,693 | A * | 12/1952 | Grills | 83/102.1 |
| 2,665,531 | A | 1/1954 | Sivertsen | |
| 2,728,176 | A | 12/1955 | Ritzert | |
| 2,808,084 | A * | 10/1957 | Eschenburg et al. | 83/438 |
| 3,051,207 | A | 8/1962 | Hartley | |
| 3,124,185 | A | 3/1964 | Karp | |
| 3,176,560 | A | 4/1965 | Bardenhagen | |
| 3,182,700 | A | 5/1965 | Engi | |
| 3,319,681 | A | 5/1967 | Anecki | |
| 3,320,990 | A | 5/1967 | Anecki | |
| 3,442,312 | A | 5/1969 | Karp | |
| 3,452,833 | A | 7/1969 | Wolters | |
| 3,515,192 | A * | 6/1970 | Docourneau | 83/86 |
| 3,583,452 | A | 6/1971 | Muller | |
| 3,613,754 | A | 10/1971 | Hartley | |
| 3,672,420 | A | 6/1972 | Hartley | |
| 3,677,316 | A | 7/1972 | Markham | |
| 3,706,736 | A | 12/1972 | Prattey | |
| 3,713,470 | A | 1/1973 | Muller | |
| 3,736,825 | A | 6/1973 | Covell | |
| 3,739,677 | A | 6/1973 | Muller | |
| 3,772,951 | A | 11/1973 | Repetto | |
| 3,782,230 | A | 1/1974 | Bettcher | |
| 3,857,310 | A | 12/1974 | Tiby | |
| 3,871,260 | A | 3/1975 | Rees | |
| 3,938,602 | A | 2/1976 | Sly et al. | |
| 3,958,475 | A | 5/1976 | Zapomel | |
| 3,958,478 | A | 5/1976 | Camper | |
| 3,965,783 | A | 6/1976 | Muller | |
| 3,986,304 | A | 10/1976 | Shie | |
| 4,015,494 | A | 4/1977 | Spooner | |
| 4,186,634 | A | 2/1980 | Akczinski, Sr. | |
| 4,208,936 | A * | 6/1980 | Whitehouse | 83/713 |
| 4,227,656 | A | 10/1980 | Engebretsen | |
| 4,246,818 | A | 1/1981 | McGraw, Jr. | |
| 4,266,456 | A | 5/1981 | Oostvogels | |
| D259,883 | S | 7/1981 | Engebretsen | |
| 4,292,749 | A * | 10/1981 | Thomas | 40/308 |
| 4,306,833 | A | 12/1981 | Sixsmith et al. | |
| 4,386,483 | A | 6/1983 | Schlaefli | |
| 4,434,694 | A | 3/1984 | Scharsig | |
| 4,499,804 | A | 2/1985 | Takeda | |
| 4,523,505 | A * | 6/1985 | Polson | 83/713 |
| 4,528,777 | A | 7/1985 | Bernstein et al. | |
| 4,532,840 | A | 8/1985 | Antonissen | |
| 4,541,319 | A | 9/1985 | Maurer et al. | |
| 4,543,868 | A | 10/1985 | Maurer et al. | |
| 4,546,685 | A | 10/1985 | Maurer et al. | |
| 4,653,373 | A | 3/1987 | Gerber | |
| 4,685,364 | A | 8/1987 | Scheflow et al. | |
| 4,732,056 | A | 3/1988 | Foster | |
| 4,732,064 | A | 3/1988 | Pearl | |
| 4,793,228 | A | 12/1988 | Etter et al. | |
| 4,811,521 | A | 3/1989 | Nakae et al. | |
| 4,813,316 | A | 3/1989 | Johnson et al. | |
| 4,817,480 | A | 4/1989 | Young | |
| 4,829,721 | A | 5/1989 | Wright | |
| 4,962,581 | A | 10/1990 | Rutigliano | |
| 5,001,887 | A | 3/1991 | Eder et al. | |
| 5,038,647 | A | 8/1991 | Biagiotti | |
| 5,101,704 | A | 4/1992 | Jones et al. | |
| 5,152,105 | A | 10/1992 | Belvederi | |
| 5,188,011 | A | 2/1993 | Somal et al. | |
| 5,209,150 | A | 5/1993 | Arconada | |
| 5,224,407 | A | 7/1993 | Koch et al. | |
| 5,241,885 | A | 9/1993 | Kuchler | |
| 5,461,957 | A | 10/1995 | Koch et al. | |
| 5,509,337 | A | 4/1996 | Norman | |
| 5,566,602 | A * | 10/1996 | Dennis | 83/168 |
| 5,615,591 | A | 4/1997 | Scherch et al. | |
| 5,649,463 | A | 7/1997 | Lindee et al. | |
| 5,666,866 | A | 9/1997 | Huang et al. | |
| 5,687,626 | A | 11/1997 | Scherch et al. | |
| 5,787,776 | A | 8/1998 | Nishimoto | |
| 5,941,148 | A | 8/1999 | Miller et al. | |
| 5,970,840 | A | 10/1999 | Yan et al. | |
| 6,016,734 | A | 1/2000 | Koch | |
| 6,092,448 | A | 7/2000 | Cartwright et al. | |
| 6,092,450 | A | 7/2000 | Dueck | |
| 6,167,791 | B1 | 1/2001 | Heckman et al. | |
| 6,209,438 | B1 | 4/2001 | Mitchell et al. | |
| D463,713 | S | 10/2002 | Zhu | |
| 6,971,381 | B2 * | 12/2005 | Langford | 128/200.23 |
| 7,077,043 | B1 * | 7/2006 | Koerble et al. | 83/719 |
| 2001/0018317 | A1 | 8/2001 | Yan | |
| 2001/0049987 | A1 | 12/2001 | Vivirito et al. | |
| 2006/0150791 | A1 | 7/2006 | Chase | |

FOREIGN PATENT DOCUMENTS

| | | | |
|---|---|---|---|
| DE | 886862 | C | 8/1953 |
| DE | 4403285 | C1 | 8/1995 |
| EP | 0115788 | A1 | 8/1984 |
| EP | 0202777 | A2 | 11/1986 |
| EP | 0248354 | A2 | 12/1987 |
| EP | 0724931 | A1 | 8/1996 |
| EP | 0776265 | A1 | 6/1997 |
| EP | 0827816 | A1 | 3/1998 |
| EP | 0 881 045 | A2 | 12/1998 |
| EP | 0972619 | A2 | 1/2000 |
| GB | 1201835 | A | 8/1970 |
| GB | 1560874 | | 2/1978 |
| GB | 2021452 | A | 12/1979 |
| GB | 2061780 | A | 5/1981 |
| WO | WO 94/11279 | | 5/1994 |
| WO | WO 95/32846 | | 12/1995 |
| WO | WO 95/33601 | | 12/1995 |
| WO | WO 96/05952 | | 2/1996 |
| WO | WO 98/55277 | | 12/1998 |
| WO | WO 00/40367 | | 7/2000 |
| WO | WO 00/66333 | | 11/2000 |

OTHER PUBLICATIONS

International Search Report, Mailed Dec. 1, 2006, PCT/US2006/032031, 4 pgs.

* cited by examiner

PRODUCT FENCE FOR A FOOD SLICER

TECHNICAL FIELD

The present invention relates generally to food slicers and more particularly to a new design for a product fence for the food slicer that provides for an enhanced sanitary environment, enables easier operation and cleaning and incorporates a number of enhanced ergonomic features.

BACKGROUND

The basic design of both manual and automatic food slicers has proven to be quite effective and durable throughout the years. Although various important improvements have been made to such slicers, the overall design has not changed very much particularly with regard to the overall cleanliness, ergonomics, or ease of operation.

Today, food slicers are utilized to slice a number of food products such as meats, cheeses and the like in a variety of environments such as delicatessens, supermarkets, and restaurants to name a few. Such food slicers need to be quite durable since they tend to be used for many hours during a day by many different individuals while providing the desired performance, safety and cleanliness.

Additionally, food slicers need to be designed to allow adaptability since they need to handle a variety of products of different shapes, sizes, and textures while readily providing slices of different thicknesses of the product being sliced. The speed at which a particular product is moved across the cutting blade can also vary on automatic food slicers to improve productivity.

Gravity food slicers with reciprocating food product tables typically have a feature called a "pusher" that engages the food product on its top surface or end opposite the blade to assist in holding the food product and increase its stability during slicing and movement of the food product table. When a long piece of food product is to be sliced (such as a long salami or the like) pushers can be removed or rotated out of the way to enable slicing of the long food product.

For some food product, typically those with a "high aspect ratio" (tall and thin), a product fence can be used to hold and stabilize the food product during slicing. Product fences typically are multi-piece assemblies made from cast aluminum, metal or both that rely on a thumb screw or the like for attachment to the product table and holding the fence in a desired position.

SUMMARY

In accordance with an embodiment, a food slicer is provided having a support member including a base portion and an upstanding portion integrally formed with the base portion. The upstanding portion includes a rotating cutting blade secured thereto for slicing food product and at least one motor positioned within the upstanding portion for rotating the cutting blade.

The base portion includes a food product table slidably secured thereto and is movable across the cutting blade for holding product while it is being sliced by the cutting blade. An adjustable gage plate also is provided for determining the thickness of a food product to be sliced by the cutting blade.

A product fence for assisting in holding and stabilizing food product during slicing is included where the fence is removably secured to a portion of the food product table by frictional engagement therebetween

BRIEF DESCRIPTION OF THE DRAWINGS

The present disclosure will become better understood with reference to the following description and accompanying drawings, wherein.

DETAILED DESCRIPTION

Figure 1:
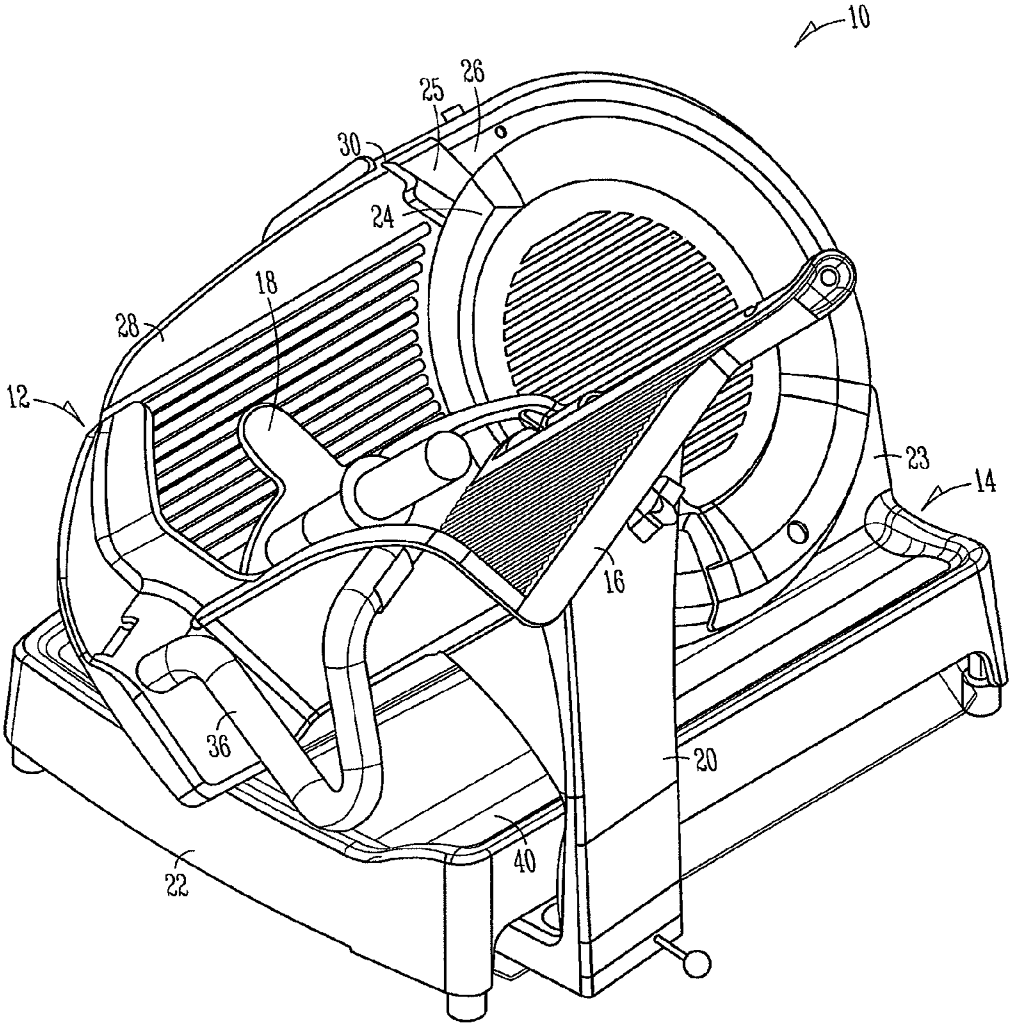
FIG. 1 is a top right perspective view of a food slicer according to one embodiment of the present invention.
Figure 2:
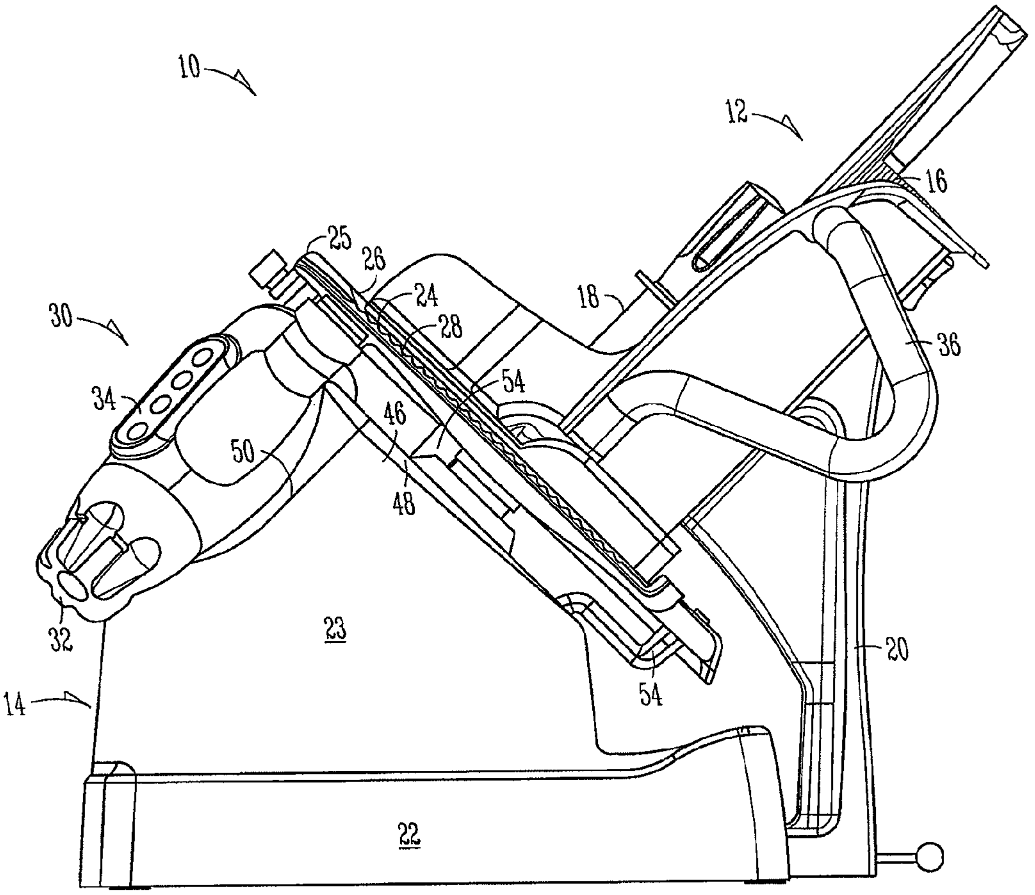
FIG. 2 is a front plan view of the food slicer of FIG. 1.

The food slicer of the present invention is generally illustrated by numeral 10 of FIGS. 1-2 wherein like parts are designated by like reference numerals. Although the present disclosure will be described with reference to the example embodiments illustrated in the figures, it should be understood that the food slicer 10 may have many alternative forms without departing from the teachings of the present invention. One of ordinary skill in the art will additionally appreciate different ways to alter the parameters of the embodiments disclosed, such as the size, shape, or type of elements or materials, in a manner that falls within the spirit and scope of the present disclosure and appended claims.

FIGS. 1 and 2 illustrate the basic components of the food slicer 10 of the present invention. The food slicer 10 substantially includes a food handling portion generally illustrated by reference numeral 12 and a support portion, housing or member generally illustrated by reference numeral 14.

The food handling portion 12 substantially includes a product table 16, a push arm or pusher 18 and a product table support arm 20. The support portion 14 substantially includes a base portion or member 22, an upstanding portion or member 23, a rotating circular slicing knife or cutting blade 24, a ring guard 25, a knife cover 26, an adjustable gage plate 28 for determining slicing thickness and a control member or operator interface 30 having a gage plate support and adjustment mechanism 32 for the gage plate 28 and control buttons 34 as illustrated in FIG. 2.

The support portion 14 also includes at least one motor (not illustrated) positioned within the inside of the upstanding portion 23. If desired, a second motor (not illustrated) may be positioned within the inside of the support portion 14 along with associated structure for automatically moving the product table 16.

Briefly, for manual slicing, a food product (not illustrated) is placed on the product table 16 beneath the pusher 18 with the end to be cut or sliced resting upon the gage plate 28 with the product table 16 in its forward position. The operator adjusts the gage plate adjustment mechanism 32 which directly moves the gage plate 28 with respect to the blade 24 to provide a slice thickness gap therebetween that corresponds to the desired thickness for slicing of the product and gets bigger with thicker slices. The control buttons 34 are then accessed to turn the motor on which in turn rotates the blade 24.

The operator then pushes the product table 16 preferably via a handle 36 or other contact point forward or to the right with respect to FIG. 1 whereby the blade 24 slices the product to the desired thickness. The operator then pulls the product table 16 backward or to the left with respect to FIG. 1 for continued slicing of the product as described above.

Figure 3:
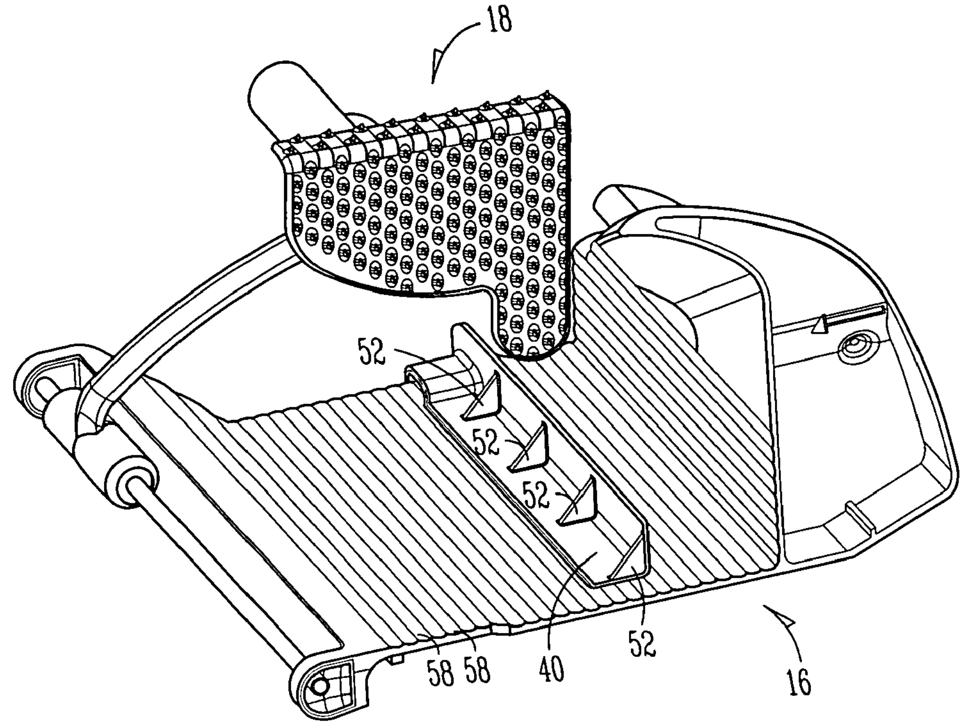
FIG. 3 is a top perspective view of a food product table of the food slicer of FIGS. 1 and 2 illustrating a product fence secured to the product table.
Figure 4:
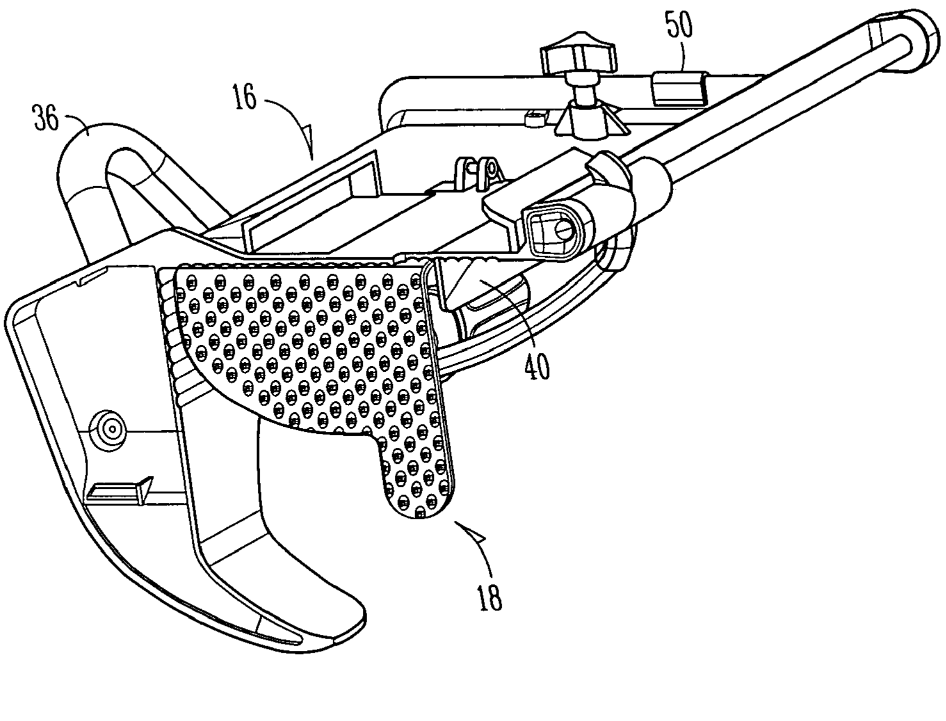
FIG. 4 is a bottom perspective view of the food product table of FIG. 3.

As FIG. 3 generally illustrates, the product table 16 includes a product fence 40 removably secured to the product table 16 to assist in holding and stabilizing particular food product during slicing. Typically, the fence 40 is used to assist in holding food product having a "high aspect ratio" or a product that is tall or long and somewhat thinner than other food products.

Figure 5:
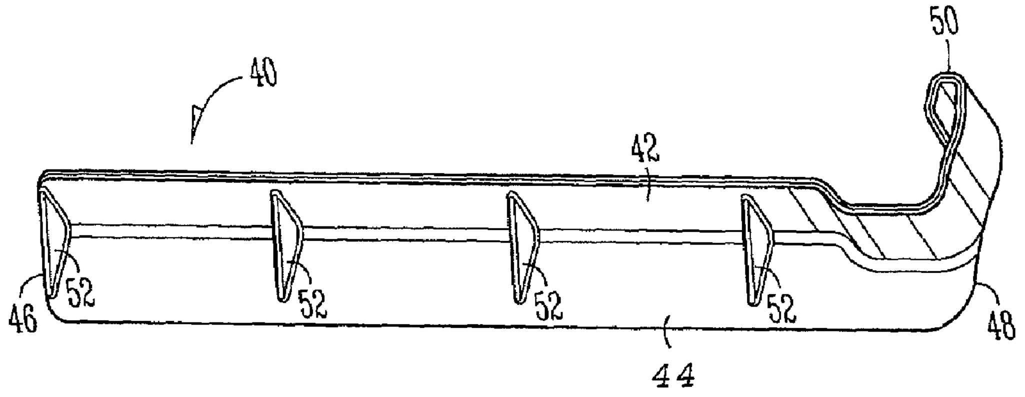
FIG. 5 is a perspective view of the product fence of FIGS. 3 and 4.
Figure 6:
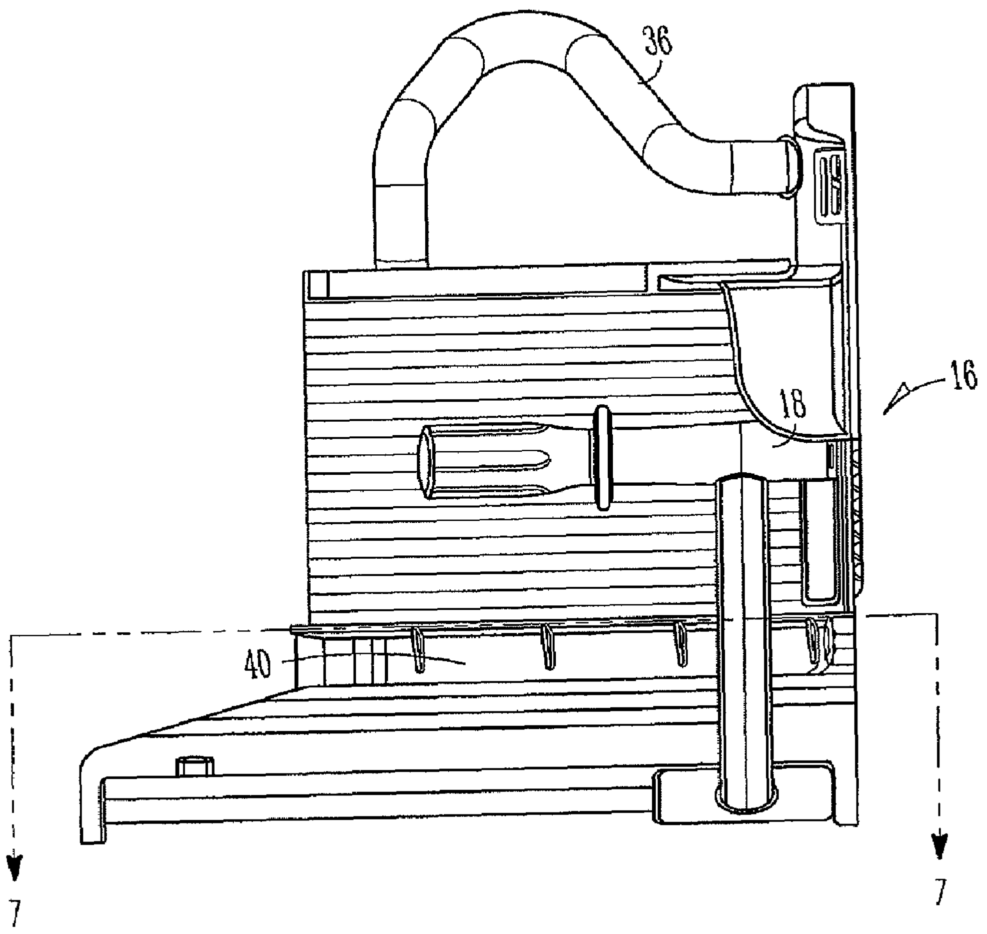
FIG. 6 is a top plan view of a food product table and fence of FIGS. 3-5.

As FIG. 5 illustrates, the fence 40 is substantially "L" shaped in cross-section formed by first and second side walls 42 and 44 and having a first end 46, a second opposite end 48 with a "C" shaped hook member 50. The fence 40 preferably is integrally formed as a single piece with a total continuous surface with no openings, seams, crevices or the like therein such as by injection molding, and preferably is made of a food contact grade of glass reinforced nylon. If desired, the fence 40 can be formed as a multiple piece part (not illustrated) and from any desired material.

To enhance its rigidity, the fence 40 can be formed to include additional strengthening members, such as reinforcement ribs or gussets 52 positioned along its length between the first and second side walls 42 and 44 or a strengthening material or additive, such as glass or the like. In practice, using 30% glass filled nylon provides the desired rigidity. It is to be understood, however, that the specific design, material, shape and method of making the fence 40 as well as the type and amount of any strengthening additive or member can vary and may include a metal such as stainless steel or aluminum or a ceramic and can be insert molded, for example.

Additionally, to assist in reinforcing the fence 40, one or more hollow channels (not illustrated) may be formed therein. These channels can be formed, for example, by an gas-assist injection molding process where a gas, typically nitrogen, is injected into the material during molding at desired locations at a specific temperature and pressure at a desired point in time during the molding process.

Figure 7:
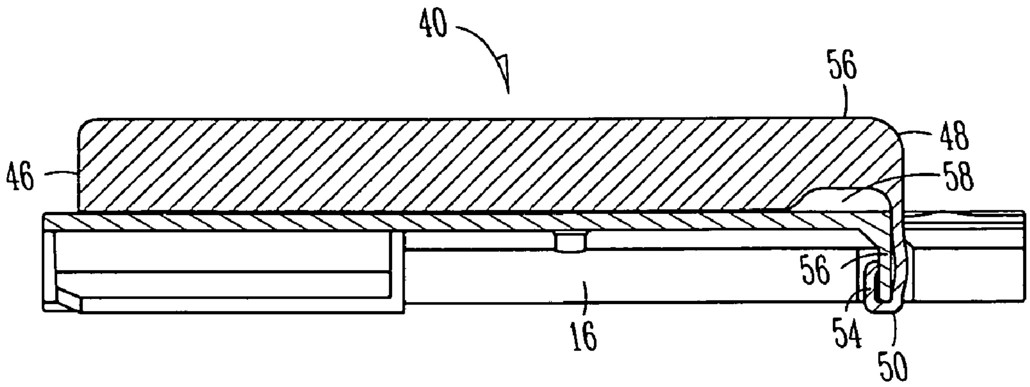
FIG. 7 is a cross-sectional view of the food product table and fence taken along lines 7-7 of FIG. 6.
Figure 8:
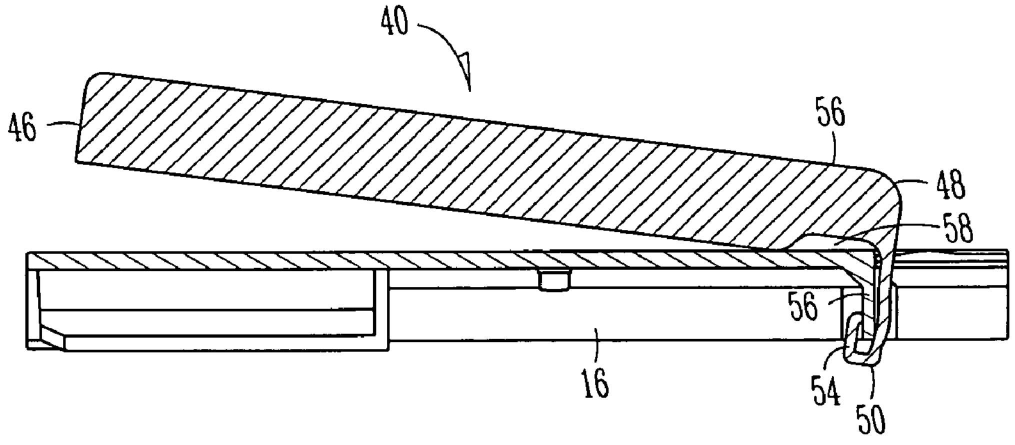
FIG. 8 is a cross-sectional view of the food product table and fence, similar to FIG. 7, illustrating attachment of the fence to the table.

As FIGS. 7 and 8 illustrate, to install the fence 40 to the product table 16 the C-shaped hook member 50 is positioned on the side of the product table 16 opposite the blade 24 (not illustrated). As FIG. 8 illustrates, a distal end 54 of the hook member 50 is positioned over an end wall 56 of the product table 16 with the fence 40 rotated so that its opposite end 46 is slightly above the top of the product table 16.

As FIG. 7 illustrates, the fence 40 is then rotated toward the product table 16 to rest against the top surface of the product table 16 and the fence 40 is frictionally engaged to the product table 16 by the spring effect of the hook member 50 with the end wall 56.

To remove the fence 40, an operator pushes down on the fence 40 at point 56 above a cut out 58 formed on the bottom side of the fence 40. As FIG. 8 illustrates, pushing down at point 56 causes the hook member 50 to move downward and the first end 46 of the fence 40 to move upward thereby disengaging the hook member 50 from the end wall 56 of the product table 16. Further rotation of the fence 40 away from the product table 16 enables the fence 40 to be completely removed from the product table 16. In practice, the fence 40 initially is rotated about 5 degrees when an operator pushes down at point 56 and then is rotated another 35-40 degrees to remove the fence 40 from the product table 16. It is to be understood, however, that the degrees of rotation can vary.

The particular design or geometry of the fence 40 and hook member 50 resists loosening and, when a slicing load is applied, tends to increase the frictional engagement of the fence 40 with the product table 16. Additionally, the angle at which the product fence is installed and removed is a function of the geometry of the hook member 50 and product table 16 and can be modified to accommodate a greater or lesser degree of rotation of the fence 40 as needed.

Thus, the fence 40 relies only on frictional engagement with the product table 16 to be secured in position on the product table 16. This is accomplished by the resilient deformation of the hook member 50 which can be adjusted merely by increasing or decreasing the width of the hook member 50.

If desired, a bottom surface of the fence 40 (not illustrated) can be formed to positively lock within flutes 58 (see FIG. 3) formed on the top surface of the product table 16.

With this design of the fence 40, no additional fasteners are needed to secure the fence 40 to the product table and the installation can be done by hand with no tools or fixtures needed. Additionally, an inexpensive fence 40 is provided that is smooth, continuous, seamless and easy to clean surface that can be easily removed for sterilization of the fence 40.

Numerous modifications and alternative embodiments of the present disclosure will be apparent to those skilled in the art in view of the foregoing description. Accordingly, this description is to be construed as illustrative only and is for the purpose of teaching those skilled in the art the best mode for carrying out the present disclosure. Details of the structure may vary substantially without departing from the spirit of the present disclosure, and exclusive use of all modifications that come within the scope of the appended claims is reserved. It is intended that the present disclosure be limited only to the extent required by the appended claims and the applicable rules of law.

What is claimed is:

1. A food slicer, comprising:

a support member having a base portion and an upstanding portion integrally formed with said base portion;

a rotating cutting blade secured to said upstanding portion for slicing food product;

at least one motor positioned within said upstanding portion for rotating said cutting blade;

a food product table slidably secured to said base portion and movable across said cutting blade for holding product while being sliced by said cutting blade;

an adjustable gage plate for determining the thickness of a food product to be sliced by said cutting blade; and a product fence for assisting in holding and stabilizing food product during slicing, said fence being removably secured to a portion of said food product table by frictional engagement between a resiliently deformable portion of said product fence and the portion of said food product table, the product fence including a main body with a lower surface adjacent a top surface of the food product table, the lower surface of the main body includes a cutout positioned at one side edge of the food product table and facing the top surface of the food product table, the resiliently deformable portion includes an integrally formed hook member that includes a first portion extending from the main body downward past the side edge of the food product table, a second portion extending laterally beyond an end wall that extends downward from the food product table and a third portion extending back toward the main body and the cutout to provide a C-shaped hook member with a slot into which the end wall of the food product table is inserted in a frictionally engaged manner.

2. The food slicer as defined in claim 1, wherein said product fence is formed as a single piece member having a total continuous surface.

3. The food slicer as defined in claim 2, wherein said product fence is removably secured to the product table without the use of separate fasteners.

4. The food slicer as defined in claim 1, wherein said product fence is molded from plastic.

5. The food slicer as defined in claim 1, wherein said product fence includes at least one of a strengthening material or member.

6. The food slicer as defined in claim 5, wherein said strengthening material is glass filled nylon.

7. The food slicer as defined in claim 5, wherein said strengthening member is at least one of a reinforcement rib or hollow channel integrally formed with said product fence.

8. The food slicer of claim 1, wherein the one side edge of the food product table is an outer side edge of the food product table.

9. A food slicer, comprising:

a support member having a base portion and an upstanding portion integrally formed with said base portion;

a rotating cutting blade secured to said upstanding portion for slicing food product;

at least one motor positioned within said upstanding portion for rotating said cutting blade;

a food product table slidably secured to said base portion and movable across said cutting blade for holding product while being sliced by said cutting blade;

an adjustable gage plate for determining the thickness of a food product to be sliced by said cutting blade; and a fence member for assisting in holding and stabilizing food product during slicing, said fence member removably secured to the product table by frictional engagement therebetween, the fence member including a hook member at a first end and positioned over a downwardly extending end wall of the food product table, the hook member including spaced apart plastic portions that exhibit a spring effect to frictionally engage the end wall, wherein the fence member further includes a bottom surface which contacts a top surface of the food product table when the fence member is frictionally engaged with the food product table, the bottom surface of the fence member includes a cut out positioned adjacent the hook member at the first end of the fence member and facing the upper surface of the food product table such that pushing down on the fence member at a point above the cutout causes the hook member to move downward and a second end of the fence member, which is opposite the first end of the fence member, to move upward to enable disengagement of the hook member from the end wall.

10. The food slicer as defined in claim 9, wherein said fence member is formed as a single piece with a total continuous surface.

11. The food slicer as defined in claim 10, wherein said fence member is removably secured to the product table without the use of separate fasteners.

12. The food slicer as defined in claim 9, wherein said fence member is molded from plastic.

13. The food slicer as defined in claim 12, wherein said strengthening member is at least one of a reinforcement rib or hollow channel integrally formed with said fence member.

14. The food slicer as defined in claim 9, wherein said fence member includes at least one of a strengthening material or member.

15. The food slicer as defined in claim 14, wherein said strengthening material is glass filled nylon.

16. The food slicer of claim 9 wherein the hook member includes an open side that faces back toward the cutout of the fence member.

* * * * *